(12) United States Patent
Cichon et al.

(10) Patent No.: US 6,685,423 B1
(45) Date of Patent: Feb. 3, 2004

(54) METHOD AND APPARATUS FOR EXTRACTING AND INSTALLING HEAT EXCHANGER BUNDLES

(75) Inventors: David E. Cichon, O-Fallon, MO (US); Jeffrey L. Wilson, Winfield, MO (US); Michael J. Uremovich, Manhattan, IL (US)

(73) Assignee: Starcon International, Inc., Manhattan, IL (US)

( * ) Notice: Subject to any disclaimer, the term of this patent is extended or adjusted under 35 U.S.C. 154(b) by 0 days.

(21) Appl. No.: 09/851,354

(22) Filed: May 8, 2001

Related U.S. Application Data
(60) Provisional application No. 60/235,131, filed on Sep. 25, 2000.

(51) Int. Cl.[7] ................................................ B66F 11/00
(52) U.S. Cl. ..................... 414/745.3; 414/497; 414/541
(58) Field of Search .............................. 414/745.3, 458, 414/495, 497, 498, 541; 180/89.12, 11, 9.1; 280/124.109, 781, 785; 296/190.07

(56) References Cited

U.S. PATENT DOCUMENTS

| | | | |
|---|---|---|---|
| 2,890,043 A | 6/1959 | Bruns | |
| 3,048,280 A | 8/1962 | Huff et al. | |
| 3,112,830 A | 12/1963 | Podlesak | |

(List continued on next page.)

FOREIGN PATENT DOCUMENTS

| | | |
|---|---|---|
| GB | 2000715 A | 1/1979 |
| WO | PC-WO 89/03795 A1 | 5/1989 |

OTHER PUBLICATIONS

Brochure for Acme 30 Ton Open End Hoist by Acme Hoist Incoporated.
Brochure for Acme 35 Ton Open End Hoist by Acme Hoist Incorporated.
Brochure for Hull Lev/Ler Control by Acme Hoist Incorporated.
Brochure Acme Boat Hoists by Acme Hoist Incorporated.
Hydro–Extractors, Inc. general product description of, and sketch of, a tube bundle extractor.
Brochure, "The Bundle Wagon" M&H Manufacturing Corporation.
Brochure, American Mechanical Services, Inc. Model Sp–A101.
Brochure, Serv–Tech, Inc., Fast Draw Bundle Extractor.
Brochure, Peinemann Equipment, Hydraulic Tube Bundle Extractor.
Brochure, Hammelmann Refinery Service System, Extractor Tool.
Bundle Wagon Parts and Instruction Manual, M & H Manufacturing Corporation.

*Primary Examiner*—Janice L. Krizek
(74) *Attorney, Agent, or Firm*—Fulbright & Jaworski L.L.P.

(57) ABSTRACT

An apparatus and a method to remove and install horizontal heat exchanger bundles. A continuous track and a main frame having a carriage frame with vertical hydraulic cylinders are used and achieve the stability necessary to support and level a heat exchanger bundle during removal from its shell at various vertical heights. The preferred configuration allows the main frame, hydraulic cylinders, pads and tracks which provide a large surface area on the ground, to remain on the ground as the hydraulic cylinders raise the carriage frame to the height of the bundle shell to increase stability of the apparatus. Moreover, the tracks allow the self-propelled extractor to move over gravel, asphalt, and/or soft uneven surfaces without becoming embedded into the surface. Alternatively, the carriage frame may be raised or moved using a crane or helicopter by removing the carriage frame from the main frame.

5 Claims, 1 Drawing Sheet

U.S. PATENT DOCUMENTS

| | | | |
|---|---|---|---|
| 3,180,498 A | 4/1965 | Postlewaite |
| 3,239,076 A | 3/1966 | Huff et al. |
| 3,239,077 A | 3/1966 | Huff et al. |
| 3,257,001 A | 6/1966 | Postlewaite et al. |
| 3,335,879 A | 8/1967 | Shaffer |
| 3,403,728 A | 10/1968 | Richardson et al. |
| 3,445,019 A | 5/1969 | Steinert |
| 3,515,300 A | 6/1970 | Hollenbach |
| 3,567,044 A | 3/1971 | Travis |
| 3,602,385 A | 8/1971 | Wilson |
| 3,608,761 A | 9/1971 | Taylor |
| 3,655,081 A | 4/1972 | Monk |
| 3,658,191 A | 4/1972 | Murphy |
| 3,688,931 A | 9/1972 | Tax et al. |
| 3,703,243 A | 11/1972 | Monk |
| 3,712,404 A | 1/1973 | Walquist |
| 3,747,789 A | 7/1973 | Shipley et al. |
| 3,765,544 A | 10/1973 | Murphy |
| 3,786,948 A | 1/1974 | Golden |
| 3,789,929 A | 2/1974 | Leidig |
| 3,792,779 A | 2/1974 | Brazell |
| 3,814,203 A | 6/1974 | Gieszl |
| 3,834,566 A | 9/1974 | Hilfiker |
| 3,836,015 A | 9/1974 | Travis |
| 3,836,025 A | 9/1974 | Olson et al. |
| 3,840,128 A | 10/1974 | Swoboda, Jr. et al. |
| 3,908,845 A | 9/1975 | Bolt |
| 3,935,951 A | 2/1976 | Claus et al. |
| 3,937,340 A | 2/1976 | Grove |
| 3,958,698 A | 5/1976 | van der Woerd |
| 3,963,130 A | 6/1976 | Maynard |
| 4,022,428 A | 5/1977 | Mantha |
| 4,053,062 A | 10/1977 | Travis |
| 4,095,335 A | 6/1978 | Lassarat |
| 4,102,463 A | 7/1978 | Schmidt |
| 4,184,425 A | 1/1980 | Haney et al. |
| 4,194,756 A | 3/1980 | van der Lely |
| 4,199,299 A | 4/1980 | Petitto, Sr. et al. |
| 4,227,854 A | 10/1980 | Coffey |
| 4,269,427 A | 5/1981 | van der Lely |
| 4,274,796 A | 6/1981 | Phillips |
| 4,312,124 A | 1/1982 | Calhoun |
| 4,323,398 A | 4/1982 | Simon |
| 4,352,406 A | 10/1982 | Fahrenschon |
| 4,358,242 A | 11/1982 | Davies |
| 4,392,524 A | 7/1983 | Bauch |
| 4,444,287 A | 4/1984 | Voelz |
| 4,480,942 A | 11/1984 | Farrow |
| 4,549,610 A | 10/1985 | van der Lely |
| 4,575,305 A | 3/1986 | Krajicek et al. |
| 4,652,195 A | 3/1987 | McArthur |
| 4,666,365 A | 5/1987 | Cradeur |
| 4,676,713 A | 6/1987 | Voelpel |
| 4,718,805 A | 1/1988 | Becker |
| 4,763,800 A | 8/1988 | Engler et al. |
| 4,834,604 A | 5/1989 | Brittain et al. |
| 4,838,438 A | 6/1989 | Ishige et al. |
| 4,856,545 A | 8/1989 | Krajicek et al. |
| 4,869,638 A | 9/1989 | Krajicek et al. |
| 4,877,365 A | 10/1989 | Lanigan Jr. et al. |
| 4,960,359 A | 10/1990 | Lovitt, Jr. |
| 5,032,054 A | 7/1991 | Krajicek et al. |
| 5,114,295 A | 5/1992 | Jansson |
| 5,169,281 A | 12/1992 | Boisture |
| 5,203,072 A | 4/1993 | Boisture |
| 5,322,410 A | 6/1994 | Persinger et al. |
| 5,323,529 A | 6/1994 | Amuny |
| 5,383,271 A | 1/1995 | Amuny |
| 5,403,145 A | 4/1995 | Cradeur et al. |
| 5,425,814 A | 6/1995 | Krajicek et al. |
| 5,562,400 A | 10/1996 | Travis |
| 5,564,179 A | 10/1996 | Amuny |

METHOD AND APPARATUS FOR EXTRACTING AND INSTALLING HEAT EXCHANGER BUNDLES

This application claims the benefit of U.S. Provisional Application Serial No. 60/235,131 filed Sep. 25, 2000.

BACKGROUND OF THE INVENTION

The present invention relates to a lifting and moving device. More particularly, the present invention relates to an apparatus and a method for removing and installing horizontally disposed heat exchanger bundles.

Heat exchangers are used in chemical processing plants, such as petroleum refineries and distilling facilities for absorbing heat created by high temperature reactions. These heat exchangers utilize long metal tubes arranged in a cylindrical bundle. The bundle is generally heavy and may vary in diameter and length. For example, often these bundles may average one to six feet in diameter, twelve to twenty-four feet long and may have a weight of two to forty tons. Further, the preceding diameter, length, and weight may be exceeded.

An individual bundle is typically inserted into a horizontally disposed shell and coupled to an inlet and an outlet in the heat exchange system which typically has multiple bundles. To facilitate heat exchange, fluid enters into a bundle from its inlet in the heat exchanger thereby flowing through the individual tubes of the bundle and exits via the outlet. Heat exchange fluid flows through the shell, past the outside of the tubes and the tube and shell fluids may travel through a series of horizontally stacked bundles before being collected for reuse or recycling. During use, the individual tubes of the bundle are subject to fouling and corrosion and also have a limited life. Thus, each bundle in the heat exchanger requires regular maintenance of the individual tubes of the bundle and eventual replacement thereof.

The physical size and weight of the bundles create significant obstacles for maintenance and replacement. For maintenance, the bundle must be removed from its shell by a bundle extractor and often transported to another on-site location or an off-site facility more suited to the work required. A large heat exchanger may have multiple bundles arranged in stacks, one above the other. Thus, the lowest bundle may be contained in a shell a few feet off of the ground while the highest may be over thirty feet above the ground.

Another obstacle is the need to support and balance the bundle as the bundle is pulled from its shell. This problem is compounded by the fact that these bundles vary in length. Thus, a method and apparatus are needed for removing these heat exchanger bundles at a wide variety of heights from ground level while keeping the bundles securely supported as they are pulled from their shells.

A heat exchanger bundle is typically removed from its shell by a pulling car or sled of the extractor that exerts a pulling force on a tube sheet which is fixed to the ends of the tube bundle. Significant force is often required to break the bundle free from its shell due to normal product corrosion between the bundle and tube sheet and the shell. A pulling mechanism such as a winch, hydraulic jack, or screw drive and motors are typically used with the extractor pulling sled to break the bundle free. Once free, the bundle is positioned on a sliding carriage mounted on a frame of the extractor such that the bundle carriage is moved along the frame as the bundle is pulled from its shell. Due to the weight and length of the bundle, the carriage and frame may be tilted to balance the bundle as the bundle is removed.

Different types of equipment have been used to support the carriage and frame of the extractors in their operative position for pulling of heat exchanger tubes bundles. U.S. Pat. Nos. 3,83,015 and 4,053,062 to Travis and U.S. Pat. Nos. 4,869,638 and 5,032,054 to Krajicek et al. disclose an aerial supported carriage and frame for being lifted by a crane and which may be moved off site using the crane or a helicopter. Another approach is mounting the frame to a telescoping column on a truck bed as disclosed in U.S. Pat. No. 4,575,305 to Krajicek et al. and U.S. Pat. No. 5,403,145 to Cradeur et al. Another extractor disclosed in U.S. Pat. No. 5,373,271 to Amuny uses four telescoping cylinders to support and lift the frame. U.S. Pat. No. 5,562,400 to Travis and U.S. Pat. No. 5,564,179 to Amuny disclose extractors that utilize wheels and drive means to provide a self-propelled bundle extractor and have outrigger lifting columns which raise the frame to the height of the bundle shell.

Extractors which require the use of cranes to position the frame at the shell of the heat exchanger bundle are not practical for use in areas with limited clearance between the heat exchanger unit and other structures. Similarly, extractors mounted on truck beds present the same space concerns. In these limited clearance areas, there may not be adequate space to position a crane or truck between the structures. Thus, a mobile extractor that is self-propelled and has a self-contained mechanism for raising and lowering its extractor frame is usually preferred due to the limited clearances between structures.

U.S. Pat. Nos. 5,562,400 and 5,564,179 disclose self-propelled extractors a support frame and carriage that are mounted on wheels with hydraulic cylinders or telescoping lifting columns. The extractor of the latter patent utilizes the lifting columns to raise both the support frame and carriage to the vertical position of the heat exchanger shell; whereas, U.S. Pat. No. 5,562,400 uses the lifting columns to raise only a carriage frame having a pulling sled and skids. Due to the extreme weight of the heat exchanger bundle, which can exceed forty tons, the use of rubber wheels is not practical because they cannot support the weight. Therefore, steel wheels with polyurethane shells are used.

One problem with self-propelled extractors of this type is that the heat exchanger units are typically located outside on asphalt or gravel surfaces which may become soft due to rain or sun exposure such that the steel wheels often dig into the surface as the extractor is moved across the surface or when turning. After the bundle is pulled onto the extractor, the added weight often embeds the wheels into the surface making it impossible for the extractor to move under its own power. As an alternative, a self-propelled extractor may provide for lifting the extractor with a crane such as that disclosed in U.S. Pat. No. 5,564,179. Due to the weight of the extractor and bundle, which may be over sixty-five tons, a large crane is required. Under some union rules, the operation of a large crane requires two workers, an operator and an oiler. However, for the operation of smaller cranes, only one worker is required, the operator. To support two shifts of extractor operations, the added oiler increases the labor costs approximately $6,000 to $8,000 per shift per week.

Another problem with known extractors is that the telescoping columns which lift the support frame and carriage of the extractor to the height of the shell become very unstable when the support frame is near or at the top of its vertical travel due to the progressive upwardly shifting of the extractor's center of gravity. The four telescoping columns usually have to support the entire weight of the support frame carriage and eventually the bundle, e.g. see U.S. Pat.

No. 5,564,179. Furthermore, as the bundle is being pulled onto the carriage, the added weight of the bundle to the front of the extractor adjacent the shell shifts the center of mass of the extractor, rendering it unstable. Likewise, as the bundle is being pulled from the shell and onto the carriage, the changing position of its center of mass may tilt the extractor frame such that one of the front or the rear columns may support more weight than the others, which may cause the extractor to tilt or rock. Thus, added precautions must be taken to prevent or compensate for the sudden shifts in weight to prevent the extractor from overturning.

Accordingly, a method and apparatus are needed that provide a heat exchanger bundle extractor apparatus that remains stable when removing or installing heat exchanger bundles at high levels above ground surface. Further, a method and apparatus which can fit into tight spaces for accessing bundles, while still having stability during a pulling operation with the ability to transport a pulled bundle to another location thereafter, is needed.

SUMMARY OF THE INVENTION

In accordance with the present invention, a continuous track having a predetermined surface area and main frame having a carriage frame with four vertical hydraulic cylinders may be used and may achieve the stability necessary to support and level a heat exchanger bundle during removal from its shell at various vertical heights and to move the extractor, with or without a bundle, across gravel, asphalt, and uneven surfaces. Preferably, two fourteen inch wide, eight foot, continuous, tracks consisting of flat polystyrene plates passing around multiple wheels attached to a mainframe may be used to support and provide movement to the extractor. An engine, preferably an air cooled diesel engine over hydraulic, may be used to rotate the tracks and thereby may allow the extractor to be driven to and from the in-use location of the heat exchanger bundles. The tracks may provide a large predetermined and substantially constant surface area to spread the load of the extractor and the bundle on the ground. Accordingly, the large constant surface area may prevent the track from becoming embedded into the ground as it rolls and thereby may overcome the limitations of steel wheels. Further, the track may allow the extractor to traverse uneven, soft, or rough ground which may be difficult to impossible for steel-wheeled extractors to traverse.

Preferably, the lower portions of four hydraulic cylinders may be vertically mounted at the corners of a rectangular main frame of the extractor. The base of each cylinder may have a pad of at least seventy-five inches for engaging the ground and may have a spherical joint. When the extractor is stationary for removing a bundle, each pad may be positioned using the knuckle joint to match the grade of the ground to balance and support the extractor which may increase stability in its stationary position.

The outside upper portion of the hydraulic cylinders may be attached to a carriage frame and a piston may be attached via a siamese cylinder mounted to the main frame. Actuating the piston may raise and lower the carriage frame with respect to the main frame. Accordingly, each cylinder may be independently controlled to tilt and level the carriage frame to compensate for a grade in the surface and the changing center of gravity of the extractor during removal of the bundle from its shell and during the raising and lowering of the carriage frame.

Alternatively, the extractor may be raised or moved using a crane or helicopter by removing the carriage frame from the main frame at disconnects located at the hydraulic cylinders and the main frame. Cylindrical horizontal shafts may be provided at each corner of the carriage frame for attaching slings to lift the carriage frame and bundle. This provides a lightweight, aerial extractor by eliminating the main frame, track, drive motor, and hydraulic cylinders.

The preferred configuration allows the main frame, hydraulic cylinders, pads and tracks which provide a large surface area on the ground, to remain on the ground as the hydraulic cylinders raises the carriage frame to the height of the bundle shell. Thus, the present invention increases the surface area for supporting the load of the extractor over previously available extractors. Further, the stationary rectangular main frame which remains near the ground when the carriage frame is raised and the large surface area of the tracks increase stability. Moreover, the tracks may overcome the obstacles presented by steel wheels, thereby allowing the self-propelled extractor to move over gravel, asphalt, and/or soft and uneven surfaces without becoming embedded into the surface.

To this end, in an embodiment of the present invention, an apparatus is provided for removing a heat exchanger bundle. The apparatus has a frame, a propelling mechanism on the frame, a vertically shiftable portion of the frame, and a track associated with the propelling mechanism. A flat portion is in engagement with a predetermined area of the ground.

In an embodiment, lifting members are provided having feet wherein the plurality of lifting members raise the frame.

In an embodiment, power cylinders having feet are provided wherein the power cylinders raise the frame.

In an embodiment, a pulling member is associated with the frame wherein the pulling member attaches to the heat exchanger bundle.

In an embodiment, the track is an articulated track having segmented portions.

In an embodiment, the flat portion of the track extends lengthwise.

In an embodiment, a base frame and an upper frame are provided wherein the base frame is larger than the upper frame and the base frame remains fixed as the upper frame vertically shifts.

In an embodiment, a base frame portion and a smaller frame portion of the frame is provided wherein the smaller frame portion is detachable from the frame such that the heat exchanger bundle and the smaller frame portion may be lifted from the base frame portion.

In an embodiment, a connection is provided between the base frame portion and the smaller frame portion.

In an embodiment, the frame has a length substantially aligned with that of the heat exchanger bundle.

In an embodiment, a track is provided on either side of the frame.

In another embodiment of the present invention, a method is provided for supporting a load to be removed from an in-use location. The method comprises the steps of providing an apparatus for removing the heavy load; providing a propelling mechanism on the apparatus; providing a track associated with the propelling mechanism where the track has a flat portion in engagement with a predetermined area of the ground; aligning a vertically shiftable frame portion of the apparatus with the load; removing the load from the in-use location; shifting the load onto the frame portion; spreading the load over a predetermined area on a support surface adjacent to the in-use location; and stabilizing the apparatus as the load is shifted.

In an embodiment, a method is further provided for spreading the load by at least one substantially flat load spreading surface portion in engagement with the support surface over the predetermined area on the support surface.

In an embodiment, a method is further provided for integrating the propelling mechanism with the apparatus such that the apparatus is self-propelled.

In an embodiment, a method is provided for maneuvering the apparatus onto the support surface.

In an embodiment, a method is provided for rolling a continuous propelling surface of the propelling mechanism of the apparatus.

In an embodiment, a method is further provided for including the flat load spreading surface portion along the support surface.

In an embodiment, a method is provided for maintaining substantially the same predetermined area of engagement between the load spreading surface portion of the propelling surface and support surface to propel the apparatus to a remote location from the in-use location.

In an embodiment, a method is further provided for sizing the flat load spreading surface portion so that the predetermined area of engagement with the support surface attempts to avoid deforming the support surface with the load carried on the apparatus.

In an embodiment, a method is provided for propelling the apparatus carrying the load to a remote location from the in-use location while minimizing deformation of the support surface during transport.

In an embodiment, a method is further provided for providing a first frame portion and a second frame portion of the apparatus wherein the first frame portion is aligned with the load to be removed and wherein the first frame portion has connections associated with the second frame portion.

In an embodiment, a method for connecting a lifting device to the connections on the first frame portion is provided.

In an embodiment, a method is further provided for disconnecting the first frame portion from the second frame portion.

In an embodiment, a method of lifting the first frame portion and the load is provided.

In an embodiment, the load is one of a plurality of heat exchanger bundles that are at various levels of elevation relative to the support surface.

In an embodiment, a method is provided for pulling the load and progressively shifting the load onto the frame portion.

In another embodiment of the present invention, a method is provided for supporting and moving a heat exchanger bundle over a transport surface. The method comprises the steps of: providing a mobile extractor apparatus having a carriage frame and a main frame; providing a propelling mechanism for moving the apparatus along the transport surface; raising the carriage frame relative to the main frame to the height of the heat exchanger bundle wherein the main frame remains near the transport surface; pulling the heat exchanger bundle onto the carriage frame; lowering the carriage frame and the heat exchanger bundle toward the transport surface; rotating an engaging surface of the propelling mechanism in contact with the transport surface; transporting the heat exchanger bundle; and supporting the heat exchanger bundle with the apparatus, the carriage frame, and the main frame while maintaining a surface area of engagement between the engaging surface and the transport surface.

In another embodiment of the present invention, a method is provided for actuating hydraulic cylinders of the mobile extractor apparatus to raise the carriage frame.

In an embodiment, a method is provided for supporting and moving a heat exchanger bundle. The method comprises the steps of: providing a mobile extractor apparatus having a carriage frame, a main frame, and a propelling mechanism; moving the mobile extractor apparatus along the transport surface with the propelling mechanism; raising the carriage frame relative to the main frame; lifting the carriage frame from the main frame to the height of the heat exchanger bundle while the main frame remains near the transport surface; pulling the heat exchanger bundle onto the carriage frame; lowering the carriage frame and the heat exchanger bundle toward the transport surface; connecting a lifting device to the carriage frame; disconnecting the carriage frame from the main frame; and lifting the carriage frame and the heavy heat exchanger bundle supported by the carriage frame while the main frame and propelling mechanism remain in contact with the engaging surface.

In an embodiment, a method is further provided for actuating hydraulic cylinders of the mobile extractor apparatus to life the carriage frame.

In an embodiment, an apparatus is provided for removing a heat exchanger bundle. The apparatus has a frame, a propelling mechanism on the frame, a vertically shiftable portion of the frame, and power cylinders wherein the power cylinders raise the vertically shiftable portion of the frame.

In an embodiment, a plurality of lifting members are provided wherein the plurality of lifting members raise the frame.

In an embodiment, feet are associated with the power cylinders.

In an embodiment, a pulling member is associated with the frame wherein the pulling member attaches to the heat exchanger bundle.

In an embodiment, a base frame portion of the frame and a smaller frame portion of the frame are provided where the smaller frame portion is detachable from the frame such that the heat exchanger bundle and the smaller frame portion may be lifted from the base frame portion.

In an embodiment, a connection is provided between the base frame portion and the smaller frame portion.

In an embodiment, the frame has a length substantially aligned with that of the heat exchanger bundle.

In an embodiment, a track is provided on each side of the frame.

It is, therefore, an advantage of the present invention to provide an apparatus and a method for removing and installing horizontally disposed heat exchanger bundles.

Another advantage of the present invention is to provide a track having polystyrene plates associated with the apparatus such that the track may provide a large predetermined and substantially constant surface area to spread the load of the apparatus and heat exchanger bundles and attempt to prevent the track from becoming embedded into the ground.

Another advantage of the present invention is to provide a track associated with the apparatus such that the apparatus may traverse uneven, soft, or rough ground.

Moreover, an advantage of the present invention is to provide four hydraulic cylinders with pads vertically mounted at the corners of the apparatus such that the pads may be positioned to match the grade of the ground.

Yet another advantage of the present invention is provide pistons attached to a carriage frame such that the piston may be actuated to raise and lower the carriage frame.

Another advantage of the present invention is provide cylinders that may be independently controlled to tilt and level the carriage frame to compensate for a grade in the surface and to compensate for the changing center of gravity of the apparatus.

Still further, an advantage of the present invention is to allow the extractor to be raised or moved by a crane or helicopter.

Additional features and advantages of the present invention are described in, and will be apparent from, the detailed description of the presently preferred embodiments and from the drawing.

DETAILED DESCRIPTION OF THE PRESENTLY PREFERRED EMBODIMENTS

Figure 1:
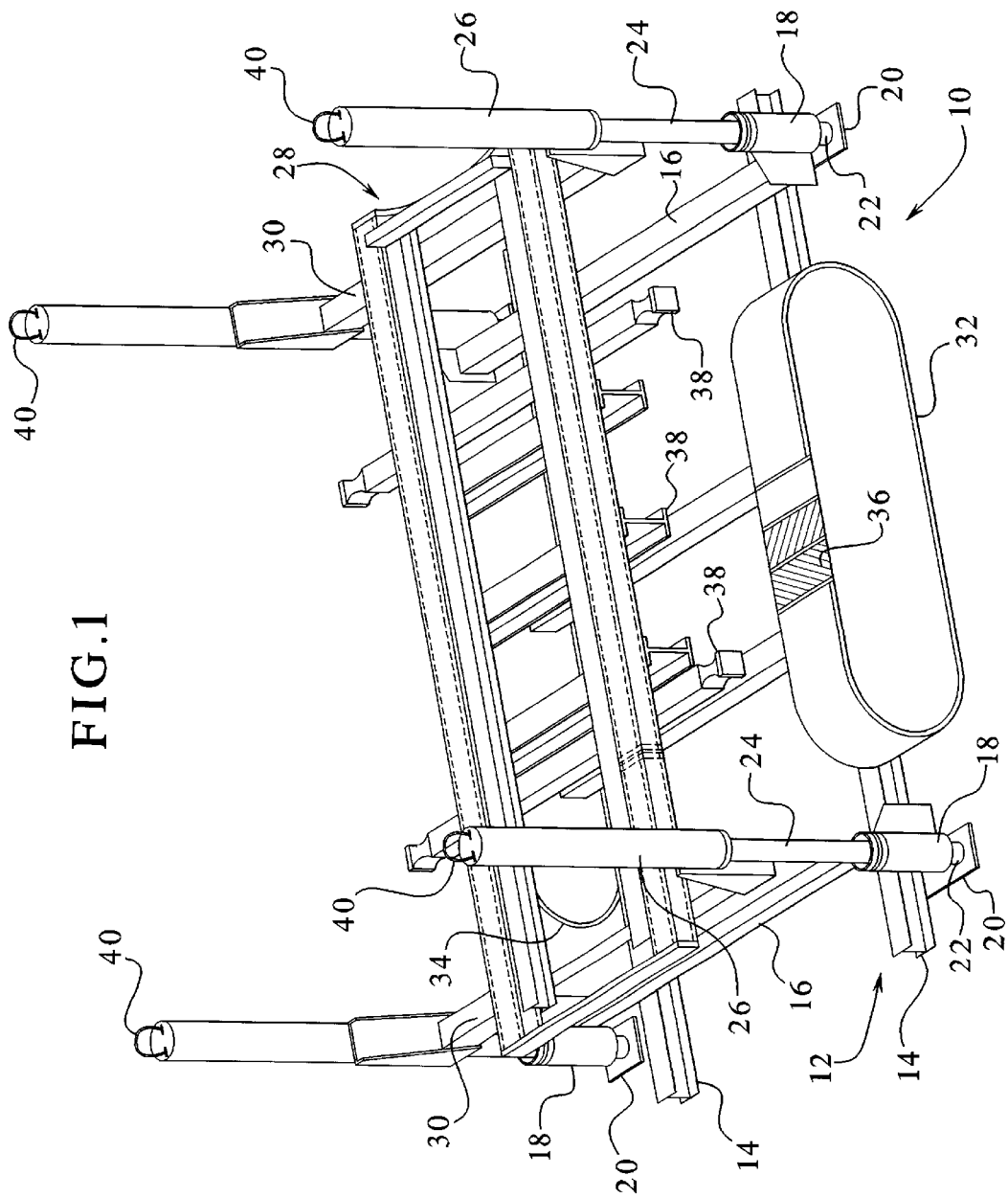
FIG. 1 illustrates a perspective view of an embodiment of the apparatus for extracting and installing heat exchanger bundles.

As shown in drawings for purposes of illustration, the invention is embodied in a heat exchanger tube bundle extractor apparatus 10. As shown in FIG. 1, the extractor apparatus 10 is embodied in a rectangular main frame 12 having a long pair of parallel members 14 and shorter parallel cross members 16. At each intersection of the long member 14 and the cross members 16 is a base cylinder 18 which may be attached thereto. Each base cylinder 18 may have a support pad 20 having approximately seventy-five square inches of surface area for engaging the ground. The support pad 20 may be attached to eight inner cylinders 22 which may be received by the base cylinder 18 such that the support pad may be lowered to the ground.

One form of the extractor apparatus 10 may utilize a spherical joint (not shown) so that the angle in which support pad 20 may engage the ground may be adjusted to accommodate the grade of the ground at a location of each of the support pads 20. Thus, each of the support pads 20 and the inner cylinder 22 may have a spherical joint so that each of the support pads 20 may be independently adjusted to increase stability of the extractor apparatus 10 when in a stationary position.

The base cylinder 18 may also receive a piston 24 from a hydraulic cylinder 26. The upper portion of the hydraulic cylinder 26 may be attached to a carriage frame 28. The carriage frame 28 may also be rectangular; however, it is smaller than the main frame 12. The carriage frame 28 may have two shorter cross members 30 at each end which may be detachably mounted to the hydraulic cylinders 26 by disconnects (not shown). When the piston 24 of the hydraulic cylinder 26 is actuated, the carriage frame 28 may be raised above main frame 12. Each of the hydraulic cylinders 26 may be independently actuated to raise and tilt the carriage frame 28 to compensate for any grade in the support surface and the changing center of gravity due to the weight of the heat exchanger bundle (not shown) as the heat exchanger bundle is pulled onto the carriage frame 28 as described herein. Independent actuation of the hydraulic cylinders 26 may eliminate the need for leveling devices on the carriage frame 28, thereby reducing weight and minimizing the number of moving parts requiring maintenance.

When the hydraulic cylinders 26 are actuated, the pistons 24 may be driven downward which in turn may raise the carriage frame 28 above main frame 12 which may remain stationary. With the main frame 12 positioned close to the ground, the extractor apparatus 10 may maintain stable as the carriage frame 28 rises. In its lowest position above the main frame 12, the carriage frame 28 may be used to remove heat exchanger bundles as low as forty-three inches off of the ground. When the hydraulic cylinders 26 are actuated to the their full length of the pistons 24, the carriage frame 28 may be approximately fifteen feet above the ground.

Mounted to each parallel long member 14 of the main frame 12 may be tracks 32 and 34. The tracks 32 and 34 have plates 36 which may be made from polystyrene and may have a large smooth surface for engaging the ground. The smooth surface of the plates 36 as compared to those having ridges or tread, may maximize the surface area of the plate for supporting the weight of the extractor apparatus 10 and heat exchanger bundle (not shown).

Alternatively, the smooth surface of the plates 36 may be replaced with a surface having tread for use on slippery terrain such as mud or loose gravel. The plates 36 may be approximately fourteen inches in width and may be positioned one after the other with a space between each of the plates 36. The plates 36 may be joined by fastening devices to compose the continuous eight foot tracks 32 and 34.

The tracks 32 and 34 may be supported by a frame (not shown) with a drive member (not shown) to rotate the tracks 32 and 34 about the frame which, in turn, provides translation of the extractor apparatus 10. The tracks 32 and 34 and frame configuration may provide a predetermined, large area of approximately sixteen square feet in contact with the ground at all times. A diesel engine (not shown) may provide the power to rotate the tracks 32 and 34 about the frame. As known in the art of track driven equipment, the tracks 32 and 34 are independently driven such that the extractor apparatus 10 may be turned by holding one track stationary while rotating the opposite track, which causes the extractor apparatus 10 to rotate in the direction of the track being held.

On the carriage frame 28 may be a series of sliding cross members 38 which may allow for adjusting the width of carriage frame 28 to accommodate the heat extractor bundles of varying width. The width of the carriage frame 28 may be adjusted for a particular diameter of the heat extractor bundle before or after transporting the heat exchanger bundle and the extractor apparatus 10 to the shell.

The extractor apparatus 10 is transported to the work location by a diesel engine that may provide power to the tracks 32 and 34. Once at the proper location, the support pads 20 may be lowered to the ground by extending the inner cylinder 22 downwards from the base cylinder 18 such that the support pad 20 is firmly planted on the ground. The support pads 20 may have a diameter of approximately seventy-five square inches and may be twice as great as that of the inner cylinder 22.

Each of the base cylinders 18 may have independent movement to accommodate uneven surfaces. Once firmly planted, the hydraulic cylinders 26 may be used to raise the carriage frame 28 to the height of the shell where the heat exchanger bundle is located. The carriage frame 28 may rise as the piston 24 of each of the hydraulic cylinders 26 is actuated. The system of the hydraulic cylinders 26 and the pistons 24 may allow the main frame 12 to remain low to the ground to provide stability and a low center of gravity. Furthermore, each of the hydraulic cylinders 26 may be independently actuated to compensate for uneven surfaces by leveling the carriage frame 28.

Once the carriage frame 28 is at the proper height location at the shell, the width of the carriage frame 28 may be adjusted using the sliding cross members 38 to accommodate the diameter of the heat exchanger bundle. A sled (not shown) that is mounted to carriage frame 28 may be used to attach the heat exchanger bundle to the extractor apparatus 10. A chain or wire cable may be used to secure the heat exchanger to the sled (not shown). The sled may also utilize a small motor (not shown) on the main frame 12 to move the sled that in turn may pull the attached heat exchanger bundle on to the carriage frame 28. As the weight of the heat exchanger bundle shifts on the carriage frame 28, the hydraulic cylinders 26 may be adjusted to keep the heat exchanger bundle level or parallel with the ground and to keep the apparatus stable and prevent tipping of the apparatus.

When the heat exchanger bundle is completely removed from the shell, the extractor apparatus 10 may be used to transport the heat exchanger bundle to a remote location for further inspection and maintenance work. The tracks 32 and 34 may be used to move the extractor apparatus 10 with the heat exchanger tube bundle carried on the carriage frame 28. This method of movement may be used to transport the heat exchanger tube bundle to the remote location, or in the alternative, the carriage frame 28 may be removed from the main frame 12 at the base cylinders 18 or alternatively at the hydraulic cylinders 26. Cables or chains (not shown) may be attached to hooks 40 to provide a means for lifting the carriage frame 28 and the heat exchanger bundle from the main frame 12 and thereby leaving the tracks 32 and 34 on the ground along with the diesel drive motor. This provides a lighter weight system that may be aerially removed using a crane or helicopter. Furthermore, the carriage frame 28 and heat exchanger bundle may be aerially removed and loaded on a flatbed truck or railcar for transportation offsite.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for supporting and moving a heat exchanger bundle, the method comprising the steps of:

providing a mobile extractor apparatus having a carriage frame and a main frame, said carriage frame having a plurality of portions;

moving the mobile extractor apparatus along a transport surface;

independently raising each of said plurality of portions of the carriage frame relative to the main frame, wherein the carriage frame is elevated to the height of the heat exchanger bundle while the main frame remains adjacent the transport surface;

pulling the heat exchanger bundle onto the carriage frame;

lowering the carriage frame and the heat exchanger bundle toward the transport surface;

connecting a lifting device to the carriage frame;

disconnecting the carriage frame from the main frame; and lifting the carriage frame and the heat exchanger bundle supported by the carriage frame from the main frame.

2. The method of claim 1, wherein the step of independently raising each of said plurality of portions of the carriage frame comprises the step of actuating hydraulic cylinders on the apparatus to raise the carriage frame relative to the main frame.

3. An apparatus for removing and installing a heat exchanger bundle, the apparatus comprising:

a frame having a base frame and an upper frame, said upper frame having a plurality of portions;

the upper frame being configured to disconnect from the base frame such that a heat exchanger bundle supported on the upper frame and the upper frame may be lifted from the base frame;

means for independently raising and lowering each of said plurality of portions of the upper frame relative to the base frame; and at least a pair of tracks supported by the base frame for advancing the frame.

4. A method for supporting a heavy load to be removed from an in-use location, the method comprising the steps of:

providing an apparatus for removing the heavy load;

providing means for advancing the apparatus wherein the advancing means is configured for maneuvering the apparatus;

providing a base frame and an upper frame having a plurality of portions, the upper frame having connections associated with the base frame;

independently raising each of said plurality of portions of the upper frame relative to the base frame, wherein the upper frame is elevated to the height of the heavy load while the base frame remains adjacent the transport surface;

aligning the upper frame with the load;

shifting the load from the in-use location onto the upper frame;

stabilizing the apparatus as the load is shifted; and disconnecting the upper frame from the base frame.

5. The method of claim 4, wherein the means for advancing the apparatus comprise at least a pair of tracks.

* * * * *